United States Patent
Baeckler et al.

(10) Patent No.: US 8,810,299 B2
(45) Date of Patent: Aug. 19, 2014

(54) SIGNAL FLOW CONTROL THROUGH CLOCK SIGNAL RATE ADJUSTMENTS

(71) Applicants: Gregg William Baeckler, San Jose, CA (US); David W. Mendel, Sunnyvale, CA (US)

(72) Inventors: Gregg William Baeckler, San Jose, CA (US); David W. Mendel, Sunnyvale, CA (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 13/648,146

(22) Filed: Oct. 9, 2012

(65) Prior Publication Data

US 2014/0097877 A1  Apr. 10, 2014

(51) Int. Cl.
*G06F 1/04* (2006.01)
*H03K 3/00* (2006.01)

(52) U.S. Cl.
USPC ............ 327/291; 327/156; 327/158; 327/161

(58) Field of Classification Search
USPC .................................. 327/156, 158, 161, 291
See application file for complete search history.

(56) References Cited

U.S. PATENT DOCUMENTS

| | | | |
|---|---|---|---|
| 4,415,986 A | 11/1983 | Chadra | |
| 7,796,462 B2 | 9/2010 | Pyeon | |
| 7,797,561 B1 | 9/2010 | Abdalla et al. | |
| 7,802,118 B1 | 9/2010 | Abdalla et al. | |
| 2002/0146023 A1 | 10/2002 | Myers | |
| 2010/0271094 A1* | 10/2010 | Hassan | 327/161 |

* cited by examiner

*Primary Examiner* — John Poos
(74) *Attorney, Agent, or Firm* — Chih-Yun Wu

(57) ABSTRACT

Control circuitry and adjustable clock signal generation circuitry is provided to control the signal transmission rate for electronic devices and systems of electronic devices. The control circuitry may receive status signals indicating current clock rates of a signal transmitting and receiving circuit as well as current processing capacity from the signal receiving circuit. The control circuitry may then generate control signals which control adjustable clock signal generation circuitry. The adjustable clock signal generation circuitry may be used to adjust the rate of generated clock signals for the signal transmitting and receiving circuits which can increase or decrease the signal transmission rate between those circuits.

25 Claims, 5 Drawing Sheets

SIGNAL FLOW CONTROL THROUGH CLOCK SIGNAL RATE ADJUSTMENTS

BACKGROUND

This invention relates to electronic devices and, more particularly, to electronic devices with a signal transmitting circuit and a signal receiving circuit.

Signal transmission and reception is the basis for communication between circuits within electronic devices as well as between circuits within different electronic devices. For example, systems involving wireline protocols such as Ethernet or Interlaken may be used to send information from one electronic device to another electronic device whereas arithmetic operations performed by an electronic device may involve the flow of information between processing stages on the electronic device. In both cases, situations frequently arise where the signal receiving circuit is momentarily not ready to accept additional data and needs to communicate this information to the signal transmitting circuit so that it momentarily suspends the transmission of new data.

Conventional architectures have addressed this issue by broadcasting a hold instruction to the signal transmitting circuit. The signal transmitting circuit then puts the signal transmission on hold for discrete clock cycles at a time. For example, the signal transmission may be disabled completely by interrupting the clock signal. Other architectures may choose to continue transmitting data and handle the pause request from the receiving circuit by introducing unused cycles of data into the transmitted signals. This is problematic for various reasons. For example, the failure of the transmitting circuit to stop sending data at the right time is a common source of incorrect behavior. The receiving circuit may receive data while it is not ready if the signal transmission interruption occurs too late, effectively leading to a loss of data. Alternatively, the receiving circuit may receive and process invalid data if the signal transmission interruption occurs too early, effectively leading to incorrect behavior in the receiving circuit.

A situation may also arise where the signal receiving circuit processes the incoming data faster than the transmitting circuit sends new data. The signal receiving circuit will then be idle until new data is sent by the signal transmitting circuit.

SUMMARY

An electronic device may include a first circuit that produces signals based on a clock signal. The electronic device may include a second circuit that receives signals from the first circuit and produces a status signal that indicates its current processing capacity. The electronic device may include control circuitry that receives the status signal from the second circuit and adjusts the clock signal of the first circuit based on the received status signal. This clock signal may be distributed using programmable or dedicated interconnection resources.

It is appreciated that the present invention can be implemented in numerous ways, such as a process, an apparatus, a system, a device, instructions on a computer readable medium, or any desired combination of the above. Several inventive embodiments of the present invention are described below.

If desired, the above mentioned electronic device may include adjustable clock signal generation circuitry that receives a control signal from the control circuitry and produces the adjusted clock signal.

The adjustable clock signal generation circuitry may use programmable phase-locked loop (PLL) circuitry or programmable delay-locked loop (DLL) circuitry (as examples). If desired, a plurality of fixed rate clock signals and a multiplexer to select the appropriate clock signal or enable circuitry which selectively disables clock signals may be used.

Further features of the invention, its nature and various advantages, will be more apparent from the accompanying drawings and the following detailed description of the preferred embodiments.

DETAILED DESCRIPTION

An electronic device or a system may include a signal transmitting circuit and a signal receiving circuit. When a signal receiving circuit approaches or exceeds its upper or lower limits for processing capacity, it would be desirable for the signal receiving circuit to be able to communicate the information about the current status back to the signal transmitting circuit so that the signal transmitting circuit may adjust signal transmission rates accordingly. For example, the signal transmitting circuit may send new data at an increased or decreased data transmission rate.

In response to receiving such information, it would be desirable for the signal transmitting circuit to accelerate, decelerate, or interrupt its signal transmission. For example, data transmission rates may be increased or decreased to accommodate current processing capacity of the signal receiving circuit. Similarly, it may be desirable for the signal receiving circuit to accelerate, decelerate, or interrupt its signal processing operation.

The signal transmitting and receiving circuits may operate using respective clock signals. The clock signals have corresponding clock frequencies (clock rates) that may be adjusted to determine the rate at which signals are processed by the circuits. Control circuitry may be used to control the clock frequencies of the clock signals based on status information from the signal receiving circuit. By using control circuitry to adjust the clock rate of the transmitting circuit, the receiving circuit, or both circuits simultaneously, performance may be improved over conventional signal transmitting and receiving circuits.

Performance improvements such as a reduction in lost data signals or an increase in data signal throughput may be obtained without significantly increasing the size of the electronic device. Adjusting the clock signal of the transmitting and receiving circuits may also scale well to larger transmitting and receiving circuit sizes and may be more area efficient than conventional methods of broadcasting a hold instruction to the signal transmitting circuit.

It will be obvious to one skilled in the art, that the present exemplary embodiments may be practiced without some or all of these specific details. In other instances, well-known operations have not been described in detail in order not to unnecessarily obscure the present embodiments.

Figure 1:
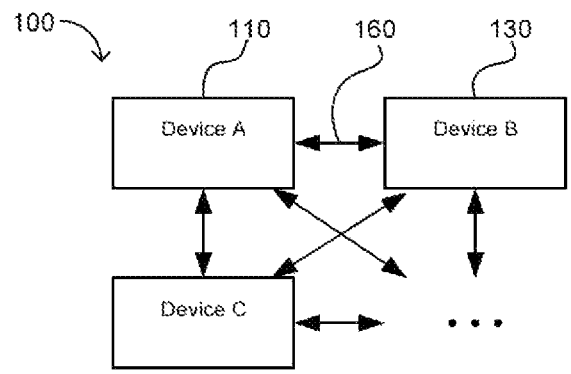
FIG. 1 is a diagram of an illustrative system of interconnected devices in accordance with an embodiment of the present invention.

An illustrative system 100 of interconnected electronic devices is shown in FIG. 1.

The system of interconnected electronic devices has one or more electronic devices such as device A 110 and device B 130 and interconnection resources 160. The electronic devices may be any suitable type of electronic devices that communicates with other electronic devices. Examples for such electronic devices include basic electronic components and circuits such as analog circuits, digital circuits, mixed-signal circuits, and integrated circuits that are interconnected on a printed-circuit board (PCB). Examples of such electronic devices also include complex electronic systems such as network routers and cell phone base stations or parts thereof that communicate with each other over wired or wireless networks. Interconnection resources 160 such as conductive lines and busses, optical interconnect infrastructure, or wired and wireless networks with optional intermediate switches may be used to send signals from one electronic device to another electronic device or to broadcast information from one electronic device to multiple other electronic devices.

Figure 2:
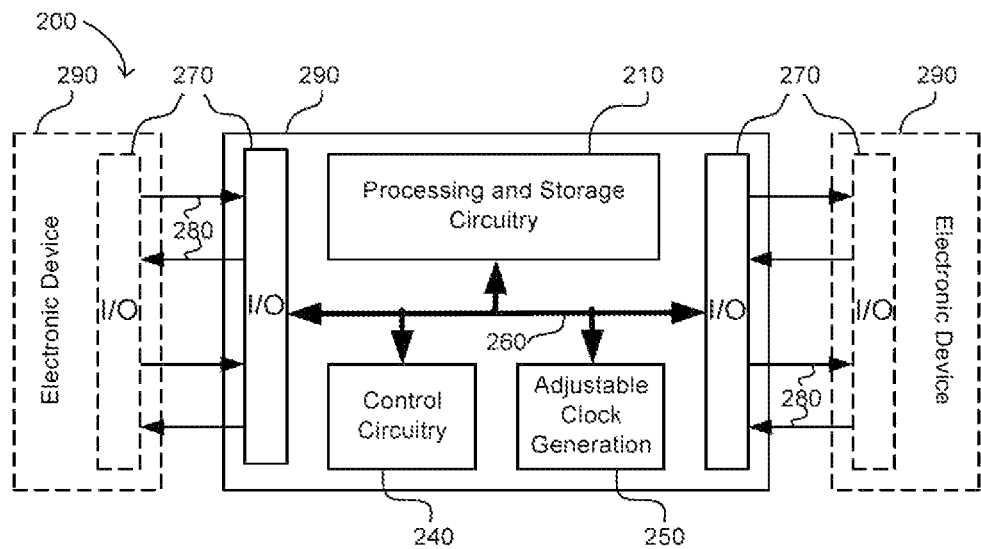
FIG. 2 is an illustrative diagram of interconnected integrated circuits in accordance with an embodiment of the present invention.

FIG. 2 shows an illustrative embodiment of a system 200 of electronic devices 290. In the example of FIG. 2, electronic devices 290 are integrated circuits. However, this example is merely illustrative. Electronic devices 290 may be any desired electronic devices such as electronic devices 110 of FIG. 1.

Integrated circuits 290 may include processing and storage components 210 such as random-access memory (RAM), first-in first-out (FIFO) circuitry, stack or last-in first-out (LIFO) circuitry, read-only memory (ROM), or other memory elements, embedded microprocessors, digital signal processors (DSP), microcontrollers, or other processing circuitry, control circuitry 240 to control the adjustable clock generation block 250, and interconnection resources 260 such as conductive lines and busses. Interconnection resources 260 may be used to send signals from one component to another component or to broadcast signals from one component to one or more other components. For example, interconnection resources 260 may be used to distribute a clock signal from the adjustable clock generation block 250 to some or all of the components in the integrated circuit. The integrated circuit may include input/output circuitry 270 which may include parallel input/output circuitry, differential input/output circuitry, serial data transceiver circuitry, or any other desired input/output circuitry. Input/output circuitry 270 may be used for transmitting and receiving signals over interconnection resources 280 when communicating with other devices.

For example, integrated circuit 290 may transmit serialized data signals at a given transmission rate to another integrated circuit over interconnection resources 280 using input/output circuitry 270. If desired, parallel data signals may be transmitted using input/output circuitry 270. The signal receiving integrated circuit may be configured to communicate its processing capacity in form of a status signal back to the signal transmitting integrated circuit. The transmitting integrated circuit 290 may receive the status signal using input/output circuitry 270. The status signal may be conveyed from input/output circuitry 270 to control circuitry 240 over interconnection resources 260. Control circuitry 240 may provide control signals to adjustable clock generation circuitry 250 via interconnection resources 260 based on the status signal.

Adjustable clock generation circuitry 250 may include a phase-locked loop (PLL) circuit, a delay-locked loop (DLL) circuit, or other suitable clock signal generation circuitry combined with clock rate adjusting circuitry. The adjustable clock generation circuitry 250 may alter the rate of the clock signal that it generates based on the signal that it receives from the control circuitry 240. The modified clock signal may then be broadcast over the interconnection resources 260 to other components in the integrated circuit. Based on the different rate of the clock signal, the data signal transmission rate out of integrated circuit 290 may be adjusted accordingly.

Figure 3:
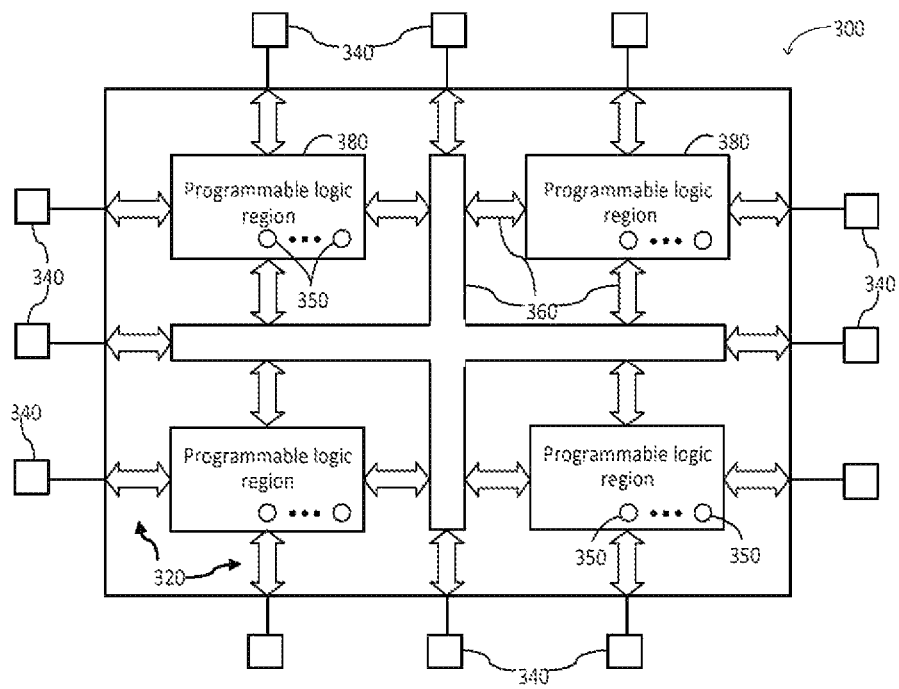
FIG. 3 is a diagram of an illustrative programmable integrated circuit such as a programmable logic device integrated circuit in accordance with an embodiment of the present invention.

Integrated circuit 290 may be a programmable integrated circuit such as programmable logic device 300 as shown in FIG. 3.

Programmable logic device 300 has input/output circuitry 320 for driving signals off of device 300 and for receiving signals from other devices via input/output pins 340. Interconnection resources 360 such as global and local vertical and horizontal conductive lines and buses may be used to route signals on device 300.

Input/output circuitry 320 includes parallel input/output circuitry, serial data transceiver circuitry, differential receiver and transmitter circuitry, or other circuitry used to connect one integrated circuit to another integrated circuit.

Interconnection resources 360 include conductive lines and programmable connections between respective conductive lines and are therefore sometimes referred to as programmable interconnects 360.

Programmable logic region 380 may include programmable components such as digital signal processing circuitry, storage circuitry, arithmetic circuitry, programmable phase-locked loop circuitry, programmable delay-locked loop circuitry, or other combinational and sequential logic circuitry. Programmable logic region 380 may further include hardened intellectual property blocks that may be configurable as well as mask programmable circuitry, and other types of hardened circuitry. The programmable logic region 380 may be configured to perform a custom logic function. The programmable interconnects 360 may be considered to be a type of programmable logic region 380.

Programmable logic device 300 contains programmable memory elements 350. Memory elements 350 can be loaded with configuration data (also called programming data) using pins 340 and input/output circuitry 320. Once loaded, the memory elements each provide a corresponding static control signal that controls the operation of an associated logic component in programmable logic region 380. In a typical scenario, the outputs of the loaded memory elements 350 are applied to the gates of metal-oxide-semiconductor transistors in programmable logic region 380 to turn certain transistors on or off and thereby configure the logic in programmable logic region 380 and routing paths. Programmable logic circuit elements that may be controlled in this way include portions of multiplexers (e.g., multiplexers used for forming routing paths in programmable interconnects 360), look-up tables, logic arrays, AND, OR, NAND, and NOR logic gates, pass gates, etc.

Memory elements 350 may use any suitable volatile and/or non-volatile memory structures such as random-access-memory (RAM) cells, fuses, antifuses, programmable read-only-memory memory cells, mask-programmed and laser-programmed structures, combinations of these structures, etc. Because memory elements 350 are loaded with configuration data during programming, memory elements 350 are sometimes referred to as configuration memory, configuration RAM, or programmable memory elements.

The circuitry of device 300 may be organized using any suitable architecture. As an example, the logic of programmable logic device 300 may be organized in a series of rows and columns of larger programmable logic regions each of which contains multiple smaller logic regions. The smaller regions may be, for example, regions of logic that are sometimes referred to as logic elements (LEs), each containing a look-up table, one or more registers, and programmable multiplexer circuitry. The smaller regions may also be, for example, regions of logic that are sometimes referred to as adaptive logic modules (ALMs). Each adaptive logic module may include a pair of adders, a pair of associated registers and a look-up table or other block of shared combinational logic (i.e., resources from a pair of LEs—sometimes referred to as adaptive logic elements or ALEs in this context). The larger regions may be, for example, logic array blocks (LABs) containing multiple logic elements or multiple ALMs.

During device programming, configuration data is loaded into device 300 that configures the programmable logic regions 380 so that their logic resources perform desired logic functions on their inputs and produce desired output signals.

The resources of device 300 such as programmable logic region 380 may be interconnected by programmable interconnects 360. Interconnects 360 may include vertical and horizontal conductors. These conductors may include global conductive lines that span substantially all of device 300, fractional lines such as half-lines or quarter lines that span part of device 300, staggered lines of a particular length (e.g., sufficient to interconnect several logic array blocks or other such logic areas), smaller local lines, or any other suitable interconnection resource arrangement. Some conductors may allow the distribution of signals to all programmable logic regions 380 of the device 300 with minimal skew if any. Those conductors are preferably used to distribute clock signals or global reset signals.

If desired, the logic of device 300 may be arranged in more levels or layers in which multiple large regions are interconnected to form still larger portions of logic. Still other device arrangements may use logic that is not arranged in rows and columns.

In addition to the relatively large blocks of programmable logic that are shown in FIG. 3, the device 300 generally also includes some programmable logic associated with the programmable interconnects, memory, and input-output circuitry on device 300. For example, input-output circuitry 320 may contain programmable input and output buffers. Interconnects 360 may be programmed to route signals to a desired destination.

For example, the programmable logic device 300 may transmit serialized data signals at a given transmission rate to another electronic device produced by a programmable logic region 380 over input/output circuitry 320 and pins 340. It may also transmit parallel data signals at a given transmission rate to another electronic device using parallel input/output circuitry 320. The signal receiving electronic device may be configured to communicate its processing capacity in form of a status signal back to the programmable logic device 300. The programmable logic device 300 may receive the status signal in its input/output circuitry 320 from where it may be sent to the control circuitry which may be implemented by programmable components in a programmable logic region 380 over interconnection resources 360. Depending on the status signal, the control circuitry may send a signal over the interconnection resources 360 to the adjustable clock generation circuitry which may also be implemented by programmable components in a programmable logic region 380.

The adjustable clock generation circuitry may alter the rate of the clock signal that it generates based on the signal that it receives from the control circuitry 240. The modified clock signal may then be broadcast over the interconnection resources 360 to other components in the programmable logic device 300. Based on the different rate of the clock signal, the data signal transmission rate out of programmable logic device may be adjusted accordingly.

The above example was described with the receiving circuitry being located in another electronic device. This other electronic device may be any type of electronic device such as basic electronic components and circuits such as analog circuits, digital circuits, mixed-signal circuits, integrated circuits that are interconnected on a printed-circuit board (PCB). Alternative embodiments may include having the transmitting and receiving circuitry within the same programmable logic region 380 or in different programmable logic regions 380 on the same programmable logic device 300.

Figure 4:
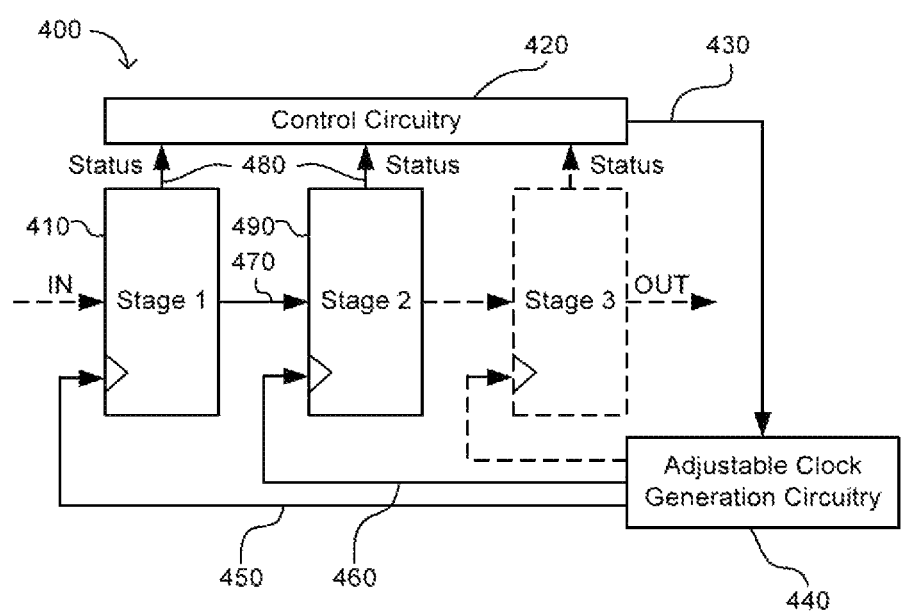
FIG. 4 is a schematic diagram of an illustrative system having multiple processing stages and adjustable clock generation circuitry in accordance with an embodiment of the invention.

Systems and electronic devices may include multiple processing stages for processing signals. FIG. 4 is an illustrative diagram of a configuration 400 of an electronic device such as programmable logic device 300 having multiple processing stages in accordance with further aspects of the invention.

Stage 1 410 may represent a processing stage implemented by programmable logic region 380 and operating according to a first clock signal received over interconnection resource 450. It may further transmit data signals over interconnection resource 470 to stage 2 490. Stage 2 may be a second processing stage in another programmable logic region 380 in which case the data signals may be transmitted using input/output circuitry 320 in programmable logic device 300. Stage 2 may also be within the same programmable logic region 380 in which case the data signals would be transmitted over interconnection resources 470 within the programmable logic region. Stage 2 490 may be operating according to a second clock signal received over interconnection resource 460.

Stage 2 490 may further send a status signal over interconnection resource 480 with information identifying its current processing capacity to the control circuitry 420. This status signal may indicate that stage 2 490 is close to using its full processing capacity or that it has reached its processing capacity limits. As an example, stage 2 490 may have a buffer that receives the incoming signals from stage 1 410 over interconnection resources 470. In this example, the processing capacity may indicate how full the buffer is.

Stage 1 410 may also send a status signal over interconnection resource 480 with information about its current clock rate to the control circuitry 420.

Based on the status signals, control circuitry 420 may send control signals over interconnection resource 430 to the adjustable clock generation circuitry 440. The control signals may direct the adjustable clock generation circuitry 440 to change the rate of the clock signal (e.g., the clock frequency) transmitted over interconnection resource 450. For example, the control signals may direct the adjustable clock generation circuitry 440 to decrease the clock rate of the first clock signal if the current processing capacity of stage 2 490 approaches its upper limit. Alternatively, the control signals may direct the adjustable clock generation circuitry 440 to increase the clock rate of the first clock signal that is transmitted over interconnection resource 450 if the current processing capacity approaches its lower limit. The control signals may also direct the adjustable clock generation circuitry 440 to suspend the transmission of the first clock signal altogether if the processing capacity of stage 2 490 has passed its upper limits.

Alternatively, the control signals transmitted over interconnection resource 430 may direct the adjustable clock generation circuitry 440 to increase the clock rate of the second clock signal that is transmitted over interconnection resource 460 if the rate of the first clock signal transmitted over interconnection resource 450 is already operating at the maximum allowable clock rate for stage 1 410 and stage 2 490 approaches or reaches its lower processing capacity limit.

Figure 5:
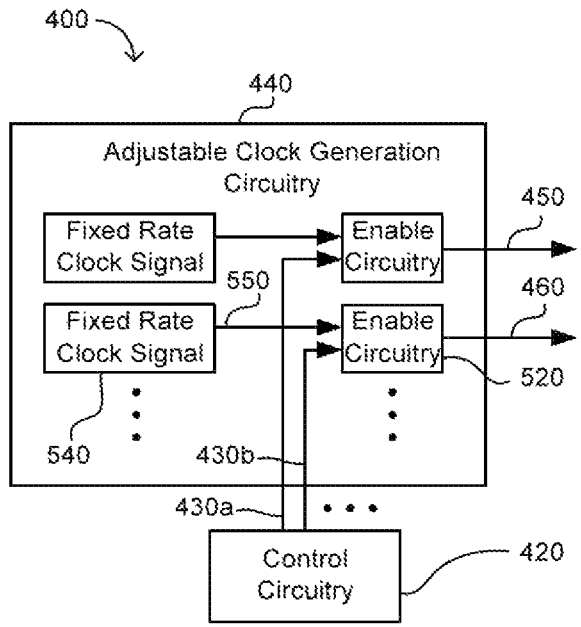
FIG. 5 is a schematic diagram of illustrative adjustable clock generation circuitry having enable circuitry that may be configured to enable and disable a clock signal in accordance with an embodiment of the present invention.
Figure 6:
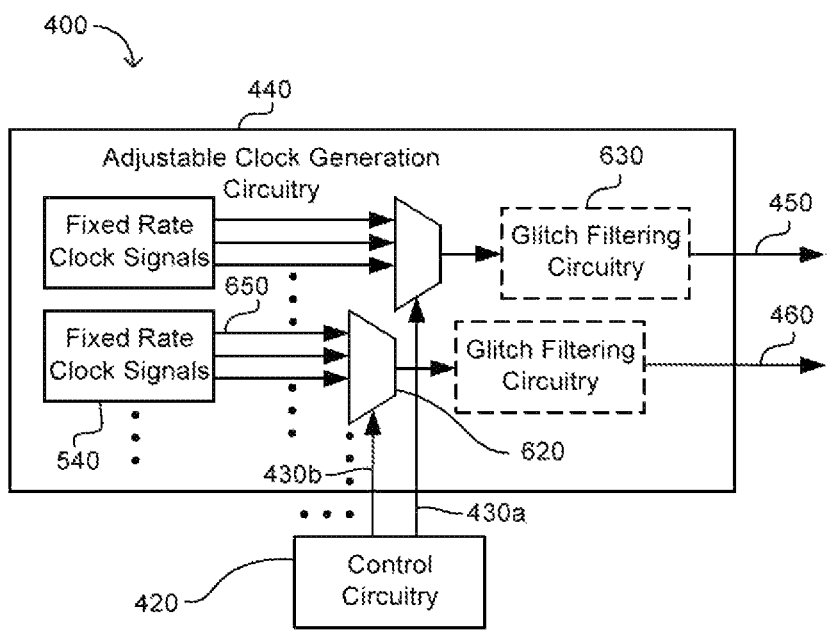
FIG. 6 is a schematic diagram of illustrative adjustable clock generation circuitry having a multiplexing circuit that may be configured to select a desired clock signal in accordance with an embodiment of the present invention.
Figure 7:
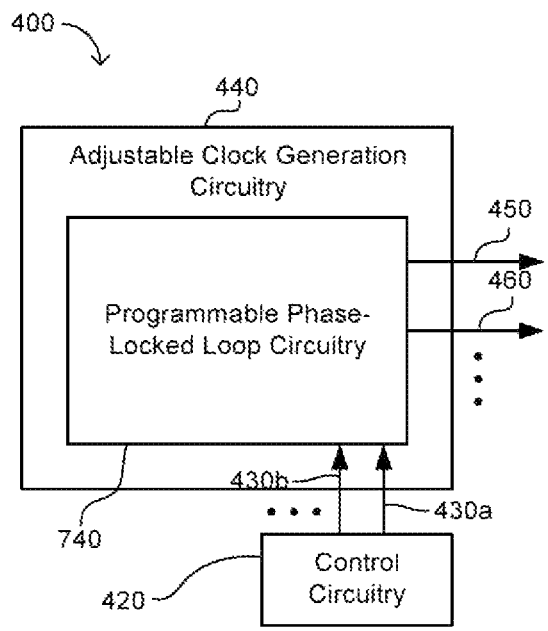
FIG. 7 is a schematic diagram of illustrative adjustable clock generation circuitry having programmable phase-locked loop circuitry that may be configured to generate adjustable clock signals in accordance with an embodiment of the present invention.

The adjustable clock generation circuitry 440 may have programmable phase-locked loop circuitry, programmable delay-locked loop circuitry, or other circuitry that allows to generate and to dynamically adjust the rate of a clock signal as illustrated in FIGS. 5, 6, and 7. It may change the clock rate of the clock signals that it transmits over interconnection resources 450 and 460 based on the control signals that it receives over interconnection resource 430.

The configuration 400 may also have several preceding or succeeding processing stages that may be operated according to the same principles.

FIG. 5 shows an illustrative embodiment for adjusting the clock rate by selectively switching the clock signal transmission on and off. The adjustable clock generation circuitry 440 may have fixed rate clock signal generation circuitry 540 that produces a clock signal at a given rate. This clock signal is sent over interconnection resource 550 to enable circuitry 520. The enable circuitry may have a simple AND gate for asynchronously enabling and disabling the clock signal, an AND gate coupled with a multiplexer circuit where the select bit is controlled by the clock signal to allow for synchronously enabling or disabling the clock signal, or other suitable enabling circuitry that allows to suspend and resume the transmission of a clock signal over interconnection resources 450 and 460. The enable circuitry 520 may be controlled by control circuitry 420. For example, the control circuitry may send a control signal to the enable circuitry 420 which may cause it to suspend the transmission of the clock signal over interconnection resource 450.

FIG. 6 shows another illustrative embodiment for adjusting the clock rate 400 by selectively increasing and decreasing the clock rate according to a step function. Here, the adjustable clock generation circuitry 440 may have fixed rate clock signal generation circuitry 540 that produces a plurality of clock signals each at a different fixed rate. These clock signals are sent over interconnection resource 650 to circuitry 620 which may select one of the incoming signals for transmission over interconnection resource 450 and another one of the incoming signals for transmission over interconnection resource 460. Circuitry 620 may be implemented as a multiplexer with pass-gates, as an AND plane followed by an OR plane, or other circuitry that allows selecting one of its inputs and passing it on to its output. Control circuitry 420 may control the selection of the signals received by circuitry 620 over interconnection resource 650 through control signal 430. When the control signal directs the multiplexer to switch between the signals that it receives over interconnection resources 650 and transmits over interconnection resources 450 and 460, the multiplexer may produce a glitch such as a short pulse. Such a glitch may occur, for instance, if the currently selected clock signal has a rising edge just before the switch followed by a falling clock edge from the newly selected clock signal after the switch. Optional glitch filtering circuitry 630 may be used to prevent glitches from being transmitted over interconnection resources 450 and 460 and thus enable smooth transitions between fixed rate clock signals. Any glitch filtering circuitry that prevents glitches from being transmitted over interconnection resources 450 and 460 may be used. For example, glitch filtering circuitry may have latches that are disabled when the multiplexer switches between incoming signals and transparent when the multiplexer doesn't switch. Alternatively, glitch filtering circuitry may use a chain of registers, or it may use enable circuitry which disables the clock signal transmission over interconnection resources 450 and 460 whenever the control signal 430 directs the multiplexer to select a different clock signal for transmission over interconnection circuitry 450 and 460, just to name a few.

For example, circuitry 620 may receive N fixed rate clock signals over interconnection resource 650 sorted by clock rate with 1 being the slowest and N being the fastest clock rate at which the circuitry that receives the clock signal transmitted over interconnect circuitry 450 may operate. Control circuitry 420 may initially send a signal over interconnection resource 430 which has the effect that clock signal n=N is selected for transmission over interconnection resource 450. The control circuitry may then receive a status signal indicating that the current processing capacity of stage 2 490 is approaching its upper limit. The control circuitry may then send a control signal that selects clock signal n=N−1 to be transmitted over interconnection resource 450 to slow down the signal transmission rate of stage 1 410 in FIG. 4. It may also send a control signal that selects another signal n with 1<=n<N−1 to be transmitted over interconnection resource 450 depending on the status signal. If the status signal further indicates that the current usage of the processing capacity of stage 2 continues to increase, the control circuitry may choose to select another clock signal m with m<n to be transmitted over interconnection resource 450 to further slow down the signal transmission rate of stage 1. These steps may be iterated until the current processing capacity of stage 2 490 in FIG. 4 stabilizes. Similarly, if the current clock rate transmitted over interconnection resource 450 is n<N and stage 2 490 in FIG. 4 sends a status signal to the control circuitry via the interconnection resource 480 indicating that stage 2 approaches the lower limit of its processing capacity, the control circuitry may send a control signal to the adjustable clock generation circuitry 440 to select a different clock signal N=>m>n with a faster clock rate to accelerate the signal transmission from stage 1 410. This step may be iterated until the current usage of the processing capacity of stage 2 490 in FIG. 4 stabilizes. If the current processing capacity of stage 2 490 continues to decrease and stage 1 410 already operates at its maximum clock rate n=N, then the control circuitry 420 may generate a control signal that selects a clock signal with a lower clock rate than the one it has currently selected to be transmitted over interconnection resource 460 to slow down the processing rate of stage 2 490.

FIG. 7 shows another illustrative embodiment for adjusting the clock rate 400. In this embodiment, the adjustable clock generation circuitry 440 uses programmable phase-locked loop (PLL) circuitry 740 which receives the control signal from the control circuitry 420 over interconnection resource 430.

Programmable PLL circuitry 740 may align the rising edge of a reference clock to a feedback clock using phase-frequency detector circuitry. It may determine the falling edge by using the duty-cycle specification, which is the ratio between the high and low levels of the clock signal. The phase-frequency detector circuitry may produce a control signal that may direct a variable frequency oscillator to operate at a higher or lower frequency. The programmable PLL circuitry 740 may also have a divide counter in the feedback loop or other suitable circuitry in the feedback loop that modifies the reference frequency. The programmable PLL circuitry 740 may further have a plurality of post-scale counters which allow a number of harmonically related frequencies to be produced by the programmable PLL circuitry 740. The control signal transmitted over interconnection resource 430 from the control circuitry 420 to the programmable PLL circuitry 740 may modify and finely tune the frequency transmitted over interconnection resources 450 and 460 in several ways. For example, the control signal may direct the programmable PLL circuitry 740 to modify the current frequency by changing the signal in the feedback loop. The control signal may also act on the post-scale counters or on the divide counter in the feedback loop. It may also choose a combination of these approaches or any other suitable approach that directs the programmable PLL circuitry 740 to change the frequency of the clock signal transmitted over interconnection resources 450 and 460.

Figure 8:
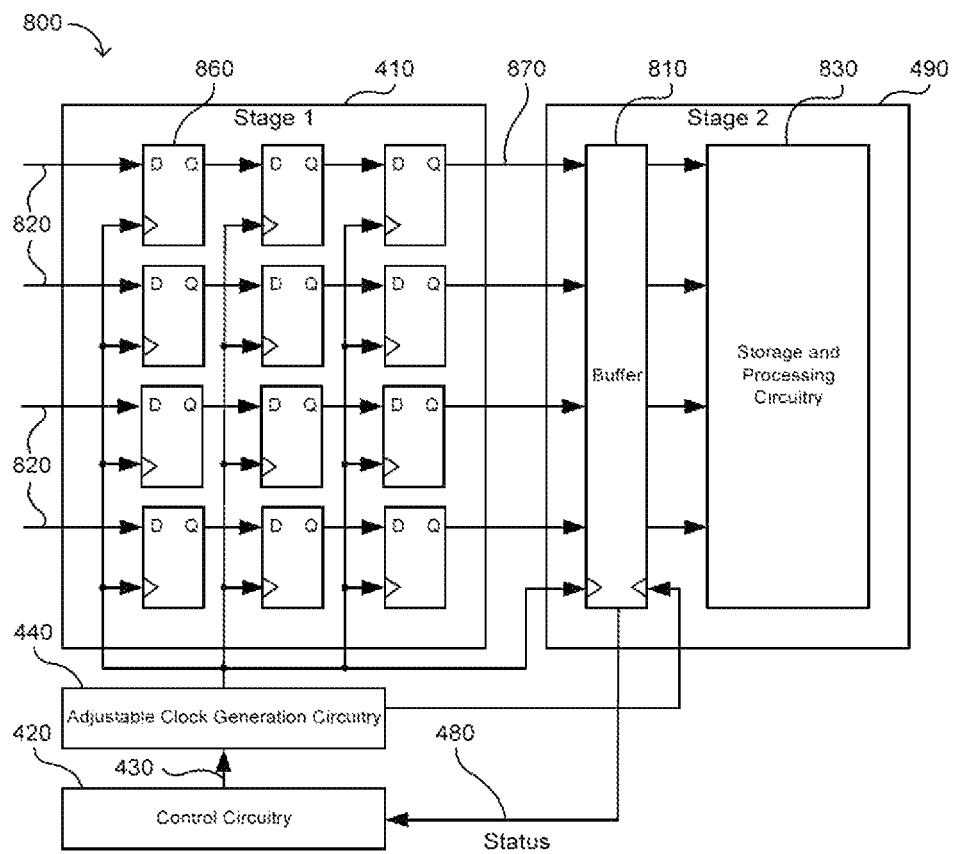
FIG. 8 is a schematic diagram of illustrative data transmitting and data receiving circuits with adjustable clock generation circuitry adjusting their clock signals as directed by control circuitry in accordance with an embodiment of the present invention.

Adjustable clock generation circuitry may be used to regulate the signal flow between successive processing stages. FIG. 8 shows an illustrative embodiment of successive processing stages 800 as shown in FIG. 4 where stage 1 410 and stage 2 490 have respective first and second clock domains.

Stage 1 410 may have a plurality of parallel pipelined processing steps 860 that receive input signals over interconnection resource 820, process these signals and transmit the processed signals over interconnection resource 870. Stage 2 490 may have a buffer 810 that has clock domain crossing functionality, i.e. the buffer receives signals in the first clock domain and transmits those signals in the second clock domain for further processing in the storage and processing circuitry 830. The buffer 810 may have shift registers, FIFOs, stacks, or other memory elements capable of storing incoming signals. Buffer 810 may further have circuitry to generate a status signal based on how full buffer 810 is. This status signal may be transmitted from the buffer 810 over interconnection resource 480 to the control circuitry 420. This status signal is used by the control circuitry 420 to generate a control signal which is sent over interconnection resource 430 to the adjustable clock generation circuitry 440. The adjustable clock generation circuitry 440 may then modify the clock rate of the first clock domain by increasing or decreasing the clock rate. It may also modify the clock rate of the second clock domain by increasing or decreasing the clock rate.

For example, increasing the clock rate of the first clock domain increases the rate at which the input signals received over interconnection resource 820 are processed inside stage 1 410 and transmitted over interconnection resource 870 to the buffer 810. Buffer 810 fills up if stage 1 410 transmits signals to the buffer 810 faster than those signals are processed by the storage and processing circuitry 830. The processing rate of storage and processing circuitry 830 depends on the clock rate of the second clock domain. The fact that the buffer 810 fills up may be transmitted back to the control circuitry as a status signal. As a result, the control circuitry may direct the adjustable clock generation circuitry to increase the rate of the second clock domain. If the second clock domain is already operating at its maximum rate and the buffer 810 continues to fill up, then the control circuitry 420 may direct the adjustable clock generation circuitry 440 to decrease the rate of the first clock domain.

Similarly, the second clock domain may operate at a clock rate such that the storage and processing circuitry 830 processes signals from buffer 910 faster than the buffer receives new signals over interconnection resource 870. In this case, the buffer 810 may become empty and this status may be transmitted back to the control circuitry 420. As a result, the control circuitry 420 may direct the adjustable clock generation circuitry 440 to increase the rate of the first clock domain which increases the processing rate of stage 1 410 and thereby the rate at which new signals are received by the buffer 810 over interconnection resource 870. Alternatively, if the first clock domain is already operating at its maximum rate, then the control circuitry 420 may direct the adjustable clock generation circuitry 440 to decrease the rate of the second clock domain.

Figure 9:
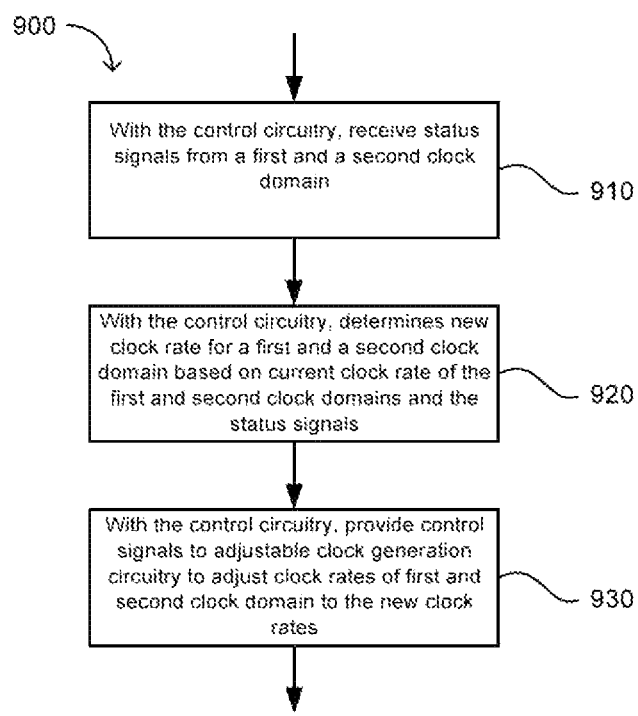
FIG. 9 is a simplified flow chart that is useful in explaining the adjustment of clock signals in response to received status signals in accordance with an embodiment of the present invention.

FIG. 9 is provided to further illustrate the flow of information that leads to the clock rate adjustments of a first and second clock domain. Again, status signals are received by the control circuitry 420 from the first and second clock domain 910. The control circuitry determines a new rate for the first and second clock domains based on the received status signals and the current clock rates of the first and second clock domains 920. The control circuitry then provides control signals to the adjustable clock generation circuitry. Those control signals direct the adjustable clock generation circuitry to adjust the clock rates of the first and second clock domains 930.

The method and apparatus described herein may be incorporated into any suitable electronic device or system of electronic devices. For example, the method and apparatus may be incorporated into numerous types of devices such as microprocessors or other ICs. Exemplary ICs include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), just to name a few.

The programmable logic device described herein may be part of a data processing system that includes one or more of the following components; a processor; memory; I/O circuitry; and peripheral devices. The data processing system can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by the assignee.

Although the method operations were described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of the overlay operations are performed in a desired way.

Additional embodiment 1. An electronic device comprising: a first circuit operable to produce signals based on a clock signal; a second circuit operable to receive the signals from the first circuit and process the received signals, wherein the second circuit is operable to produce a status signal that indicates a current processing capacity of the second circuit; and control circuitry operable to receive the status signal from the second circuit and adjust the clock signal based on the status signal.

Additional embodiment 2. The electronic device defined in additional embodiment 1 further comprising: adjustable clock signal generation circuitry operable to produce the clock signal, wherein the control circuitry is operable to adjust the clock signal by providing a control signal to the adjustable clock generation circuitry.

Additional embodiment 3. The electronic device defined in additional embodiment 2 wherein the adjustable clock signal generation circuitry comprises a programmable phase-locked loop (PLL) circuit.

Additional embodiment 4. The electronic device defined in additional embodiment 2 wherein the adjustable clock signal generation circuitry comprises a programmable delay-locked loop (DLL) circuit.

Additional embodiment 5. The electronic device defined in additional embodiment 2 wherein the adjustable clock signal generation circuitry comprises: clock circuitry operable to produce a plurality of fixed rate clock signals; and a multiplexer operable to generate a clock signal by selecting a clock signal of the plurality of fixed rate clock signals based on the control signal provided by the control circuitry.

Additional embodiment 6. The electronic device defined in additional embodiment 5 further comprising: filtering circuitry operable to receive the generated clock signal from the multiplexer, wherein the filtering circuitry is further operable to remove glitches from the generated clock signal.

Additional embodiment 7. The electronic device defined in additional embodiment 2 wherein the adjustable clock signal generation circuitry comprises enable circuitry that is operable to selectively disable a clock signal based on the control signal provided by the control circuitry.

Additional embodiment 8. The electronic device defined in additional embodiment 2 further comprising: interconnection circuitry operable to route a first clock signal from the adjustable clock generation circuitry to the first circuit and route a second clock signal from the adjustable clock signal generation circuitry to the second circuit.

Additional embodiment 9. The electronic device defined in additional embodiment 1 wherein the electronic device comprises a programmable integrated circuit having programmable logic regions configured to form the first and second circuits.

Additional embodiment 10. The electronic device defined in additional embodiment 1 wherein the second circuit comprises: a buffer operable to receive the signals from the first circuit, wherein the status signal indicates how full the buffer is.

Additional embodiment 11. A system comprising: a first electronic device operable to produce signals based on a clock signal produced by adjustable clock generation circuitry on the first device; a second electronic device operable to receive the signals from the first device and process the signals, wherein the second device is operable to produce a status signal that identifies current processing capacity of the second device; and control circuitry operable to provide a control signal to the adjustable clock signal generation circuitry that adjusts the clock signal of the first electronic device based on the status signal of the second electronic device.

Additional embodiment 12. The system defined in additional embodiment 11 wherein the second electronic device includes a buffer that is operable to receive the signals and produce the status signal.

Additional embodiment 13. The system defined in additional embodiment 11 wherein the second electronic device has an associated sensor that is operable to measure temperature of the second device and wherein the status signal is produced based on the measured temperature.

Additional embodiment 14. The system defined in additional embodiment 11 further comprising a programmable device having programmable logic that is configured to form the control circuitry.

Additional embodiment 15. The system defined in additional embodiment 11 wherein the second device receives the signals from the first device through a high speed serial interface.

Additional embodiment 16. The system defined in additional embodiment 15 wherein the high speed serial interface comprises a low voltage differential signaling (LVDS) transceiver.

Additional embodiment 17. The system defined in additional embodiment 15 wherein the high speed serial interface comprises a serializer/deserializer (SerDes) transceiver.

The foregoing is merely illustrative of the principles of this invention and various modifications can be made by those skilled in the art without departing from the scope and spirit of the invention. The foregoing embodiments may be implemented individually or in any combination.

What is claimed is:

1. A method for operating an electronic device that includes first and second circuits, wherein the first circuit operates using a first clock signal, wherein the second circuit operates using a second clock signal, and wherein the first and second clock signals have respective clock rates, the method comprising:
generating a status information related to the operation of the second circuit;
deciding whether adjusting the clock rate of the first clock signal is required based on the status information;
deciding whether adjusting the clock rate of the second clock signal is required based on the status information; and
adjusting the clock rate of the first clock signal and the clock rate of the second clock signal if the adjustment is required.

2. The method of claim 1 wherein the electronic device includes adjustable clock generation circuitry operable to produce the first and second clock signals and wherein adjusting the clock rate of the first and second clock signal based on the status information comprises:

directing the adjustable clock generation circuitry to adjust the clock rate of the first and second clock signal based on the status information.

3. The method of claim 2 further comprising:
producing output signals using the first clock signal;
receiving the output signals in the second circuit;
generating the status information, wherein the status information indicates a current processing capacity of the second circuit.

4. The method of claim 2 wherein the adjustable clock generation circuitry is operable to generate a plurality of fixed rate clock signals and select the first and second clock signals from the plurality of fixed rate clock signals and wherein directing the adjustable clock generation circuitry to adjust the clock rate of the first clock signal based on the status information comprises:
controlling which fixed rate clock signal of the plurality of fixed rate clock signals is selected by the adjustable clock generation circuitry as the first clock signal.

5. The method of claim 2 wherein the first clock signal includes clock pulses and wherein directing the adjustable clock generation circuitry to adjust the clock rate of the first clock signal based on the status information comprises:
controlling the adjustable clock generation circuitry to selectively enable and selectively disable the clock pulses of the first clock signal.

6. The method of claim 2 wherein directing the adjustable clock generation circuitry to adjust the clock rate of the first clock signal based on the status information comprises:
controlling the adjustable clock generation circuitry to adjust the frequency of the first clock signal and the second clock signal.

7. The method of claim 1 wherein adjusting the clock rate of the first and second clock signals based on the status information comprises:
adjusting the clock rate of the first circuit and the clock rate of the second circuit based on the status information and the clock rate of the first and second clock signals.

8. An electronic device comprising:
a circuit operable to produce signals based on a clock signal;
control circuitry operable to receive a status signal and adjust the clock signal based on the status signal;
adjustable clock signal generation circuitry operable to produce the clock signal, wherein the control circuitry is operable to adjust the clock signal by providing a control signal to the adjustable clock generation circuitry and wherein the adjustable clock signal generation circuitry comprises a programmable phase-locked loop (PLL) circuit.

9. An electronic device comprising:
a circuit operable to produce signals based on a clock signal;
control circuitry operable to receive a status signal and adjust the clock signal based on the status signal; and
adjustable clock signal generation circuitry operable to produce the clock signal, wherein the control circuitry is operable to adjust the clock signal by providing a control signal to the adjustable clock generation circuitry and wherein the adjustable clock signal generation circuitry comprises a programmable delay-locked loop (DLL) circuit.

10. An electronic device comprising:
a circuit operable to produce signals based on a clock signal;
control circuitry operable to receive a status signal and adjust the clock signal based on the status signal; and
adjustable clock signal generation circuitry operable to produce the clock signal, wherein the control circuitry is operable to adjust the clock signal by providing a control signal to the adjustable clock generation circuitry and wherein the adjustable clock signal generation circuitry comprises:
clock circuitry operable to produce a plurality of fixed rate clock signals; and
a multiplexer operable to generate a clock signal by selecting a clock signal of the plurality of fixed rate clock signals based on the control signal provided by the control circuitry.

11. The electronic device defined in claim 10 further comprising:
filtering circuitry operable to receive the generated clock signal from the multiplexer, wherein the filtering circuitry is further operable to remove glitches from the generated clock signal.

12. An electronic device comprising:
a circuit operable to produce signals based on a clock signal;
control circuitry operable to receive a status signal and adjust the clock signal based on the status signal; and
adjustable clock signal generation circuitry operable to produce the clock signal, wherein the control circuitry is operable to adjust the clock signal by providing a control signal to the adjustable clock generation circuitry and wherein the adjustable clock signal generation circuitry comprises enable circuitry that is operable to selectively disable a clock signal based on the control signal provided by the control circuitry.

13. The electronic device defined in claim 8 wherein the electronic device comprises a programmable integrated circuit having programmable logic regions configured to form the circuit.

14. An electronic device comprising:
a circuit that receives signals and processes the received signals based on a clock signal, wherein the circuit produces a status signal that indicates a current processing capacity of the circuit.

15. The electronic device defined in claim 14 wherein the electronic device has an associated sensor that measures temperature of the electronic device and wherein the status signal is produced based on the measured temperature.

16. The electronic device defined in claim 14 further comprising:
control circuitry that receives the status signal and adjusts the clock signal based on the status signal.

17. The electronic device defined in claim 16 further comprising:
adjustable clock signal generation circuitry that produces the clock signal, wherein the control circuitry adjusts the clock signal by providing a control signal to the adjustable clock generation circuitry.

18. The electronic device defined in claim 17 wherein the adjustable clock signal generation circuitry comprises a programmable phase-locked loop (PLL) circuit.

19. The electronic device defined in claim 17 wherein the adjustable clock signal generation circuitry comprises a programmable delay-locked loop (DLL) circuit.

20. The electronic device defined in claim 17 wherein the adjustable clock signal generation circuitry comprises:
clock circuitry that produces a plurality of fixed rate clock signals; and a multiplexer that generates a clock signal by selecting a clock signal of the plurality of fixed rate clock signals based on the control signal provided by the control circuitry.

21. The electronic device defined in claim 20 further comprising:
  filtering circuitry that receives the generated clock signal from the multiplexer, wherein the filtering circuitry removes glitches from the generated clock signal.

22. The electronic device defined in claim 17 wherein the adjustable clock signal generation circuitry comprises enable circuitry selectively disables a clock signal based on the control signal provided by the control circuitry.

23. The electronic device defined in claim 17 further comprising:
  interconnection circuitry that routes a second clock signal from the adjustable clock generation circuitry to an output of the electronic device.

24. The electronic device defined in claim 16 wherein the electronic device comprises a programmable integrated circuit having programmable logic regions configured to form the circuit.

25. The electronic device defined in claim 16 wherein circuit comprises:
  a buffer that receives the signals, wherein the status signal indicates how full the buffer is.

* * * * *